May 25, 1937.  W. E. WILKINSON  2,081,316
VAULT
Filed May 29, 1935    15 Sheets-Sheet 1
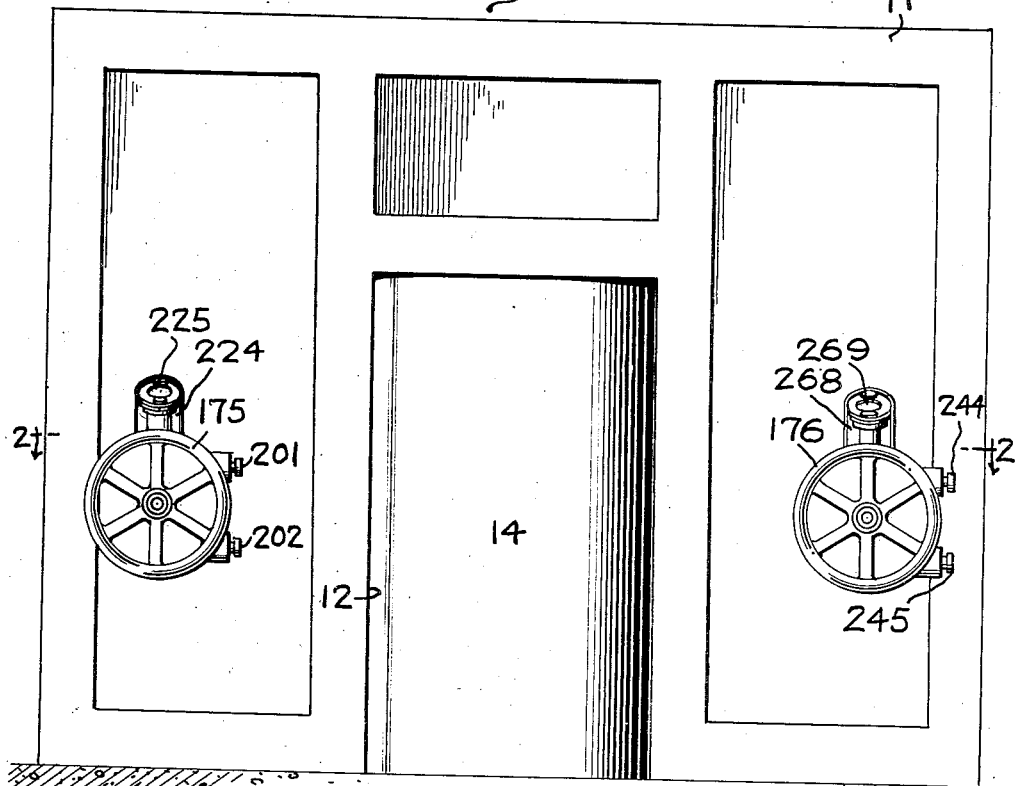
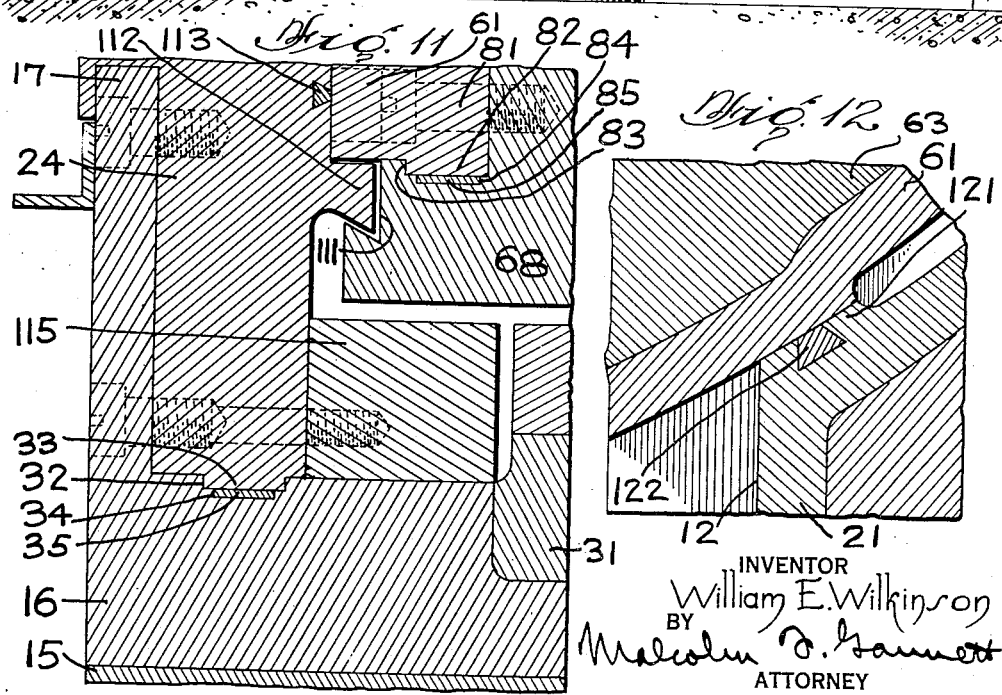
INVENTOR
William E. Wilkinson
BY
ATTORNEY

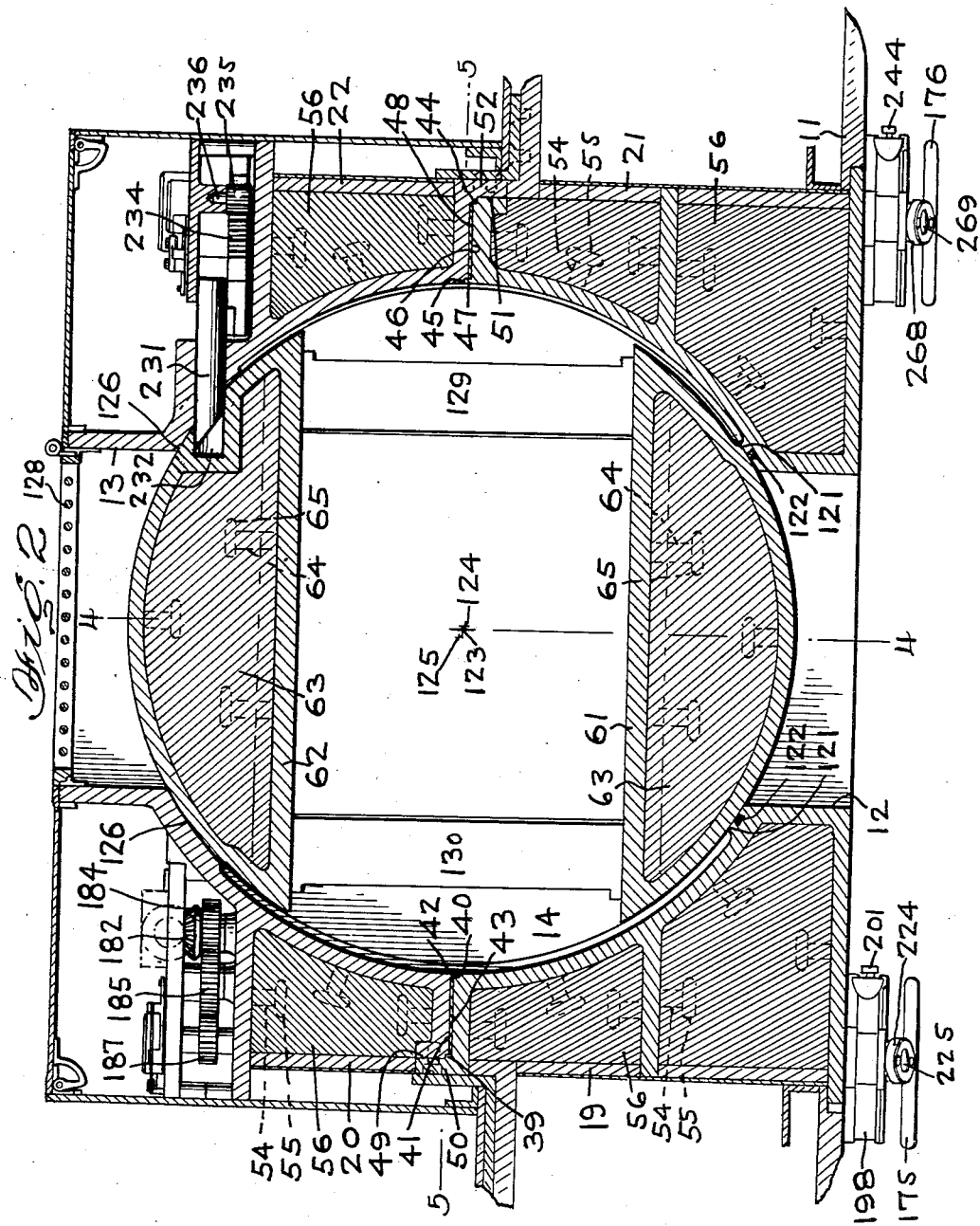

May 25, 1937.  W. E. WILKINSON  2,081,316
VAULT
Filed May 29, 1935   15 Sheets-Sheet 3
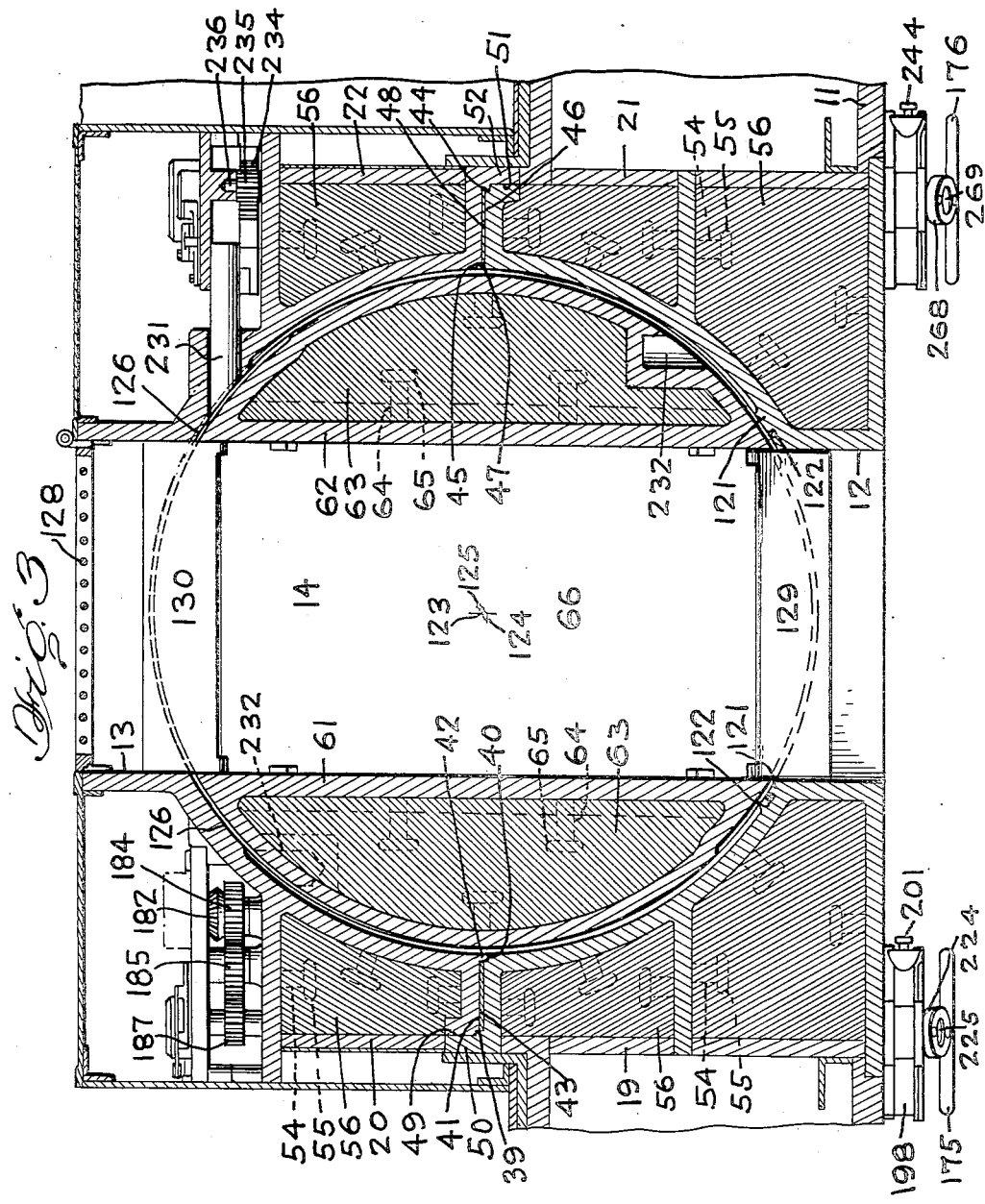

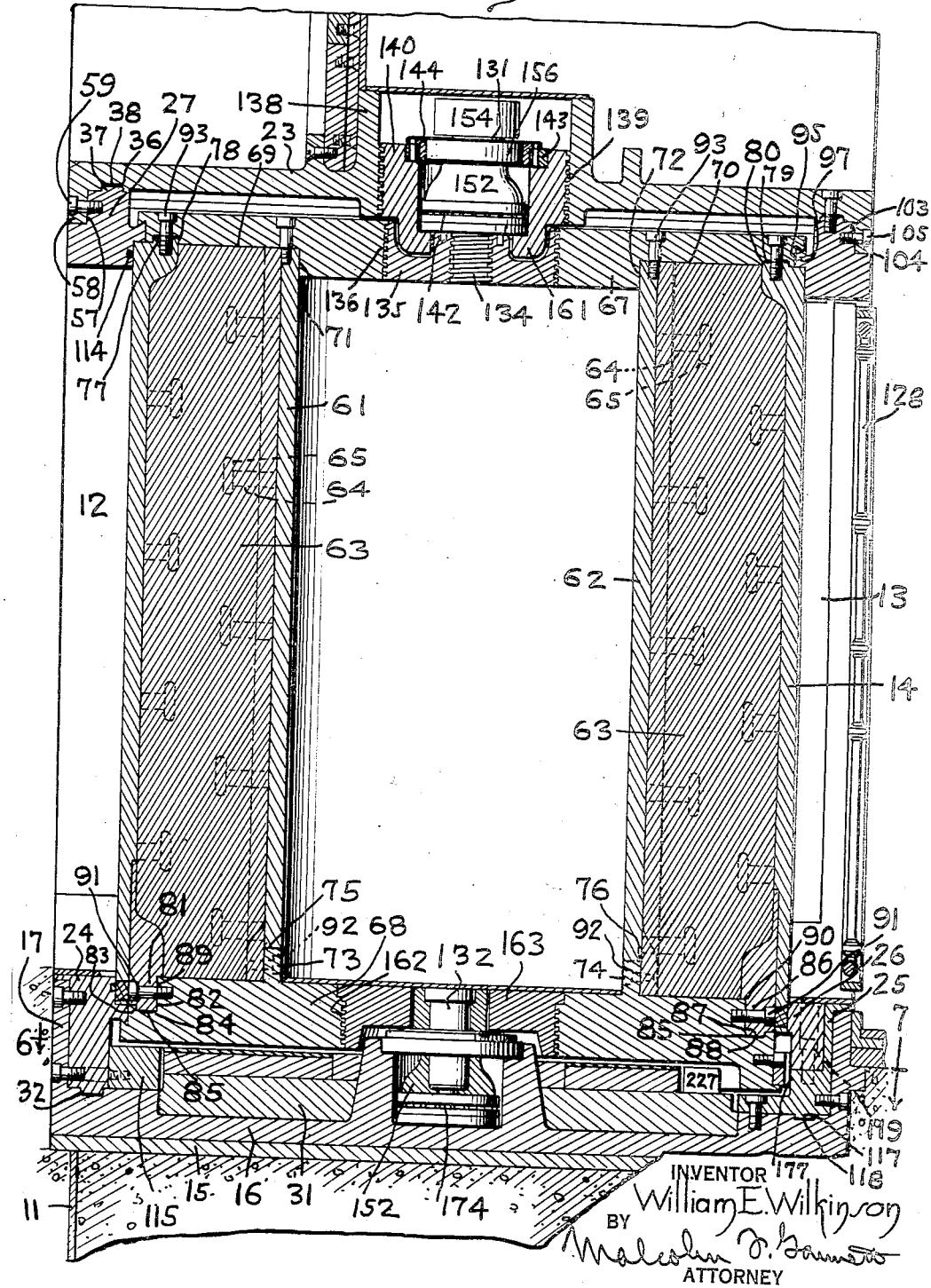

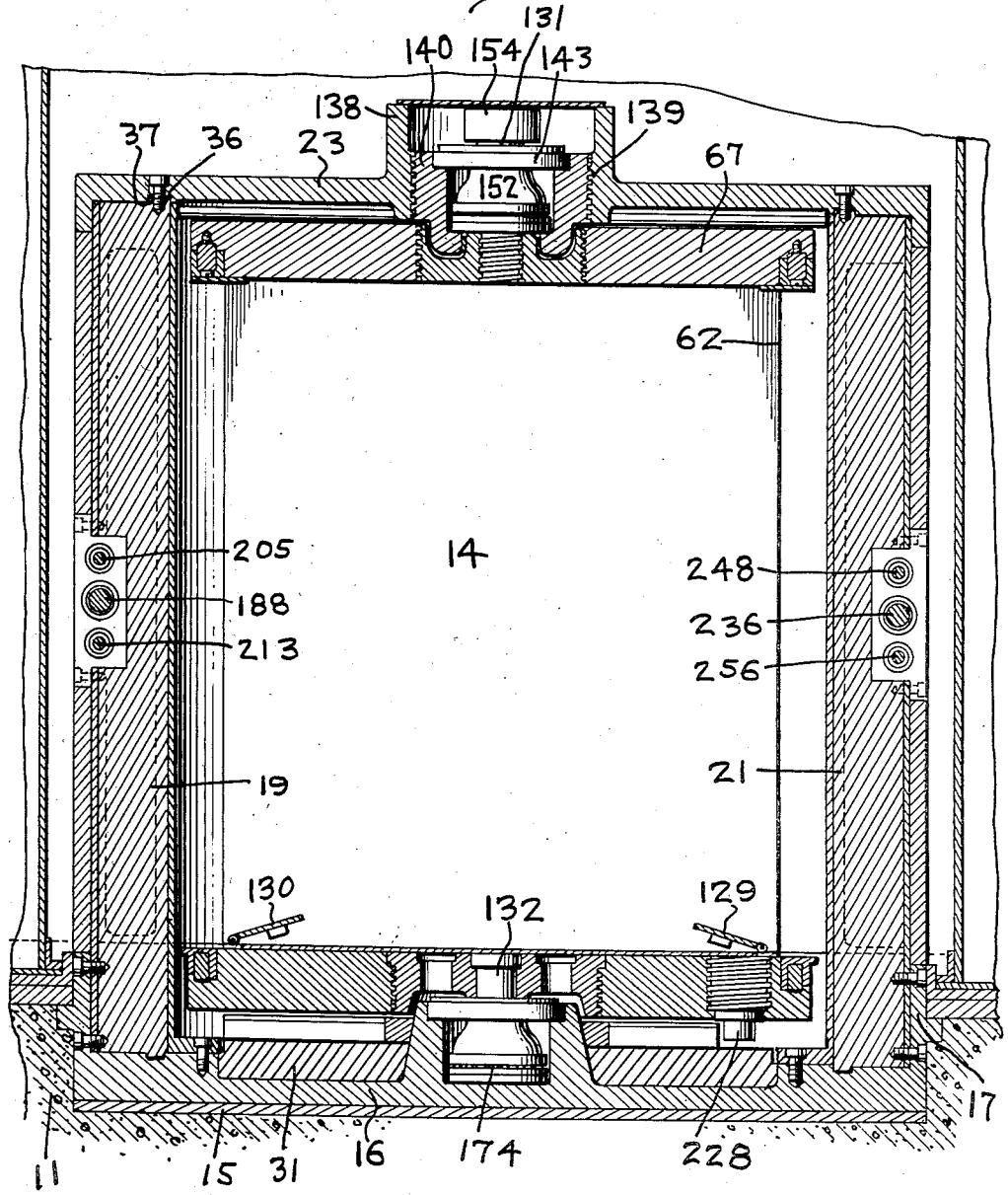

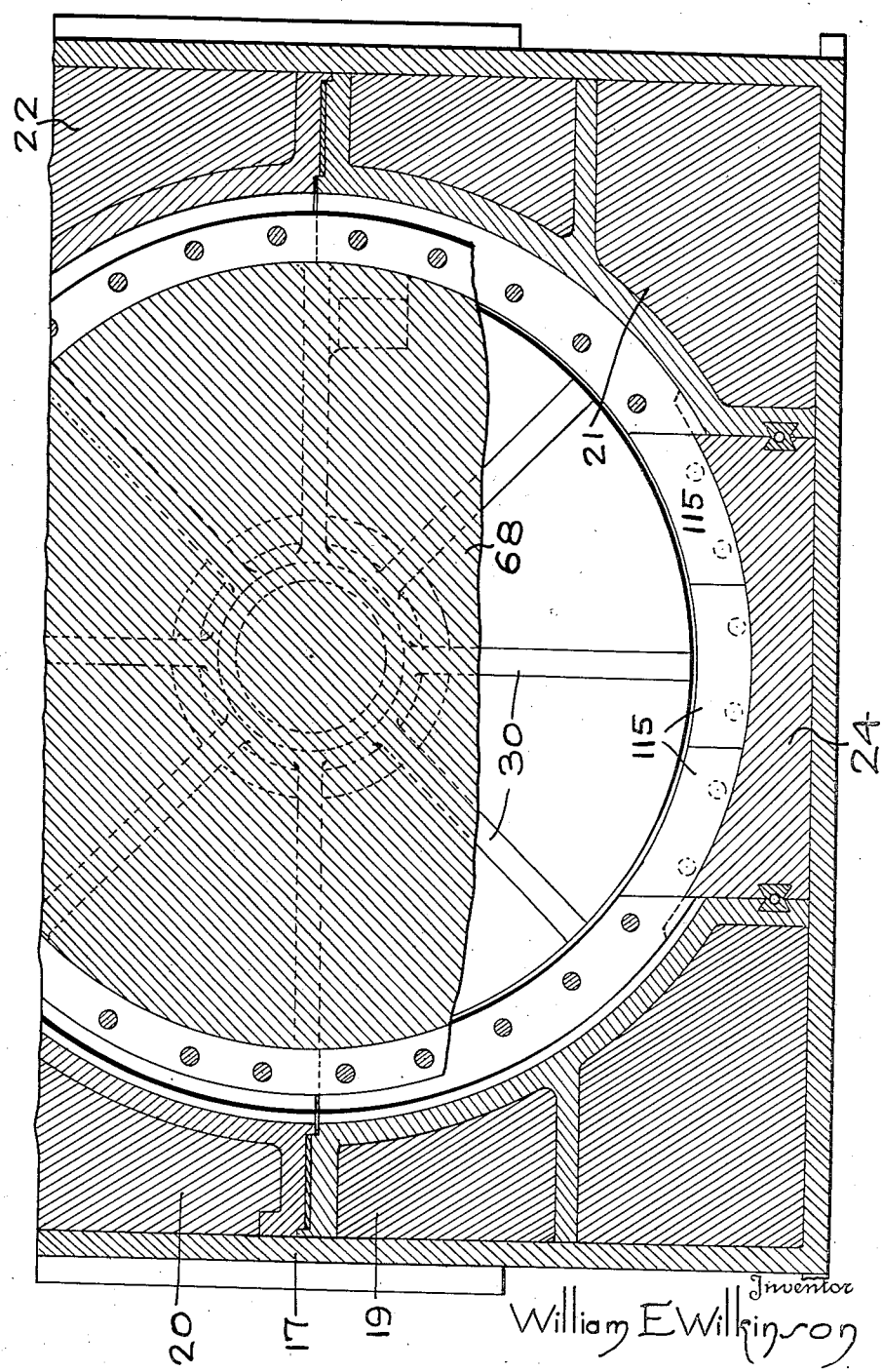

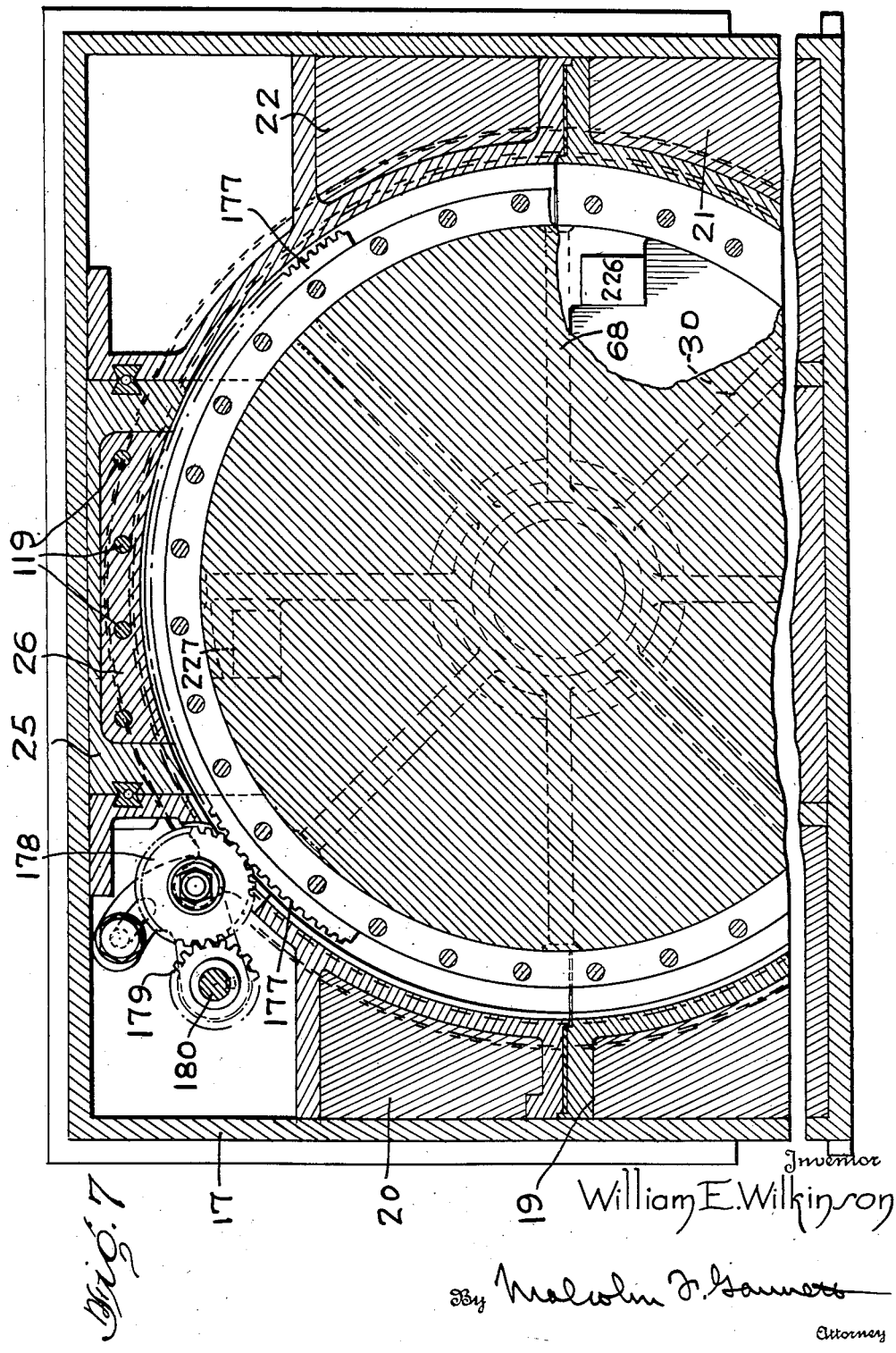

May 25, 1937.  W. E. WILKINSON  2,081,316
VAULT
Filed May 29, 1935  15 Sheets-Sheet 8
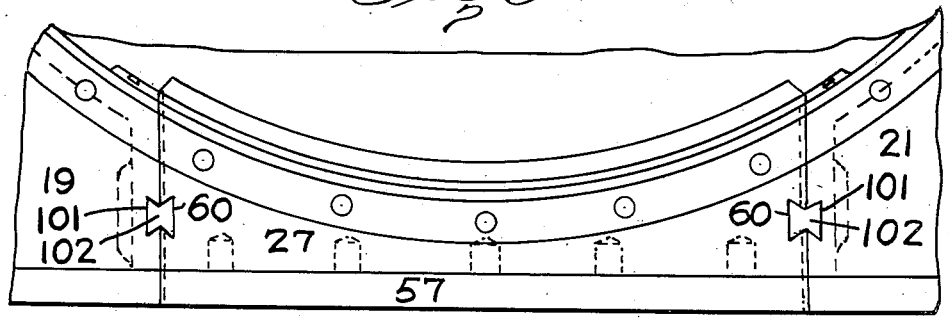
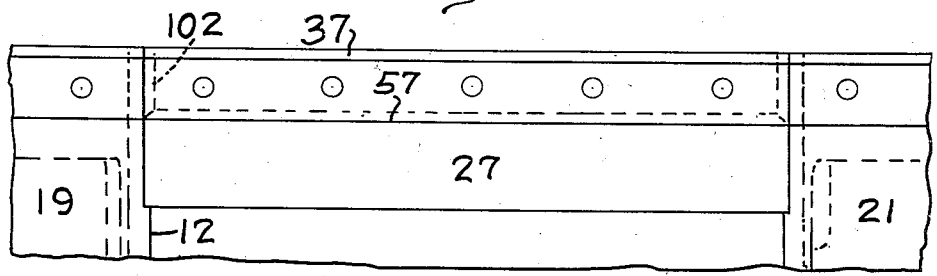
William E. Wilkinson, Inventor
By Malcolm F. Gannett, Attorney Inventor
William E Wilkinson
By Malcolm F. Gannett
Attorney May 25, 1937.  W. E. WILKINSON  2,081,316
VAULT
Filed May 29, 1935  15 Sheets-Sheet 11

Inventor
William E Wilkinson
By Malcolm F. Gannett
Attorney

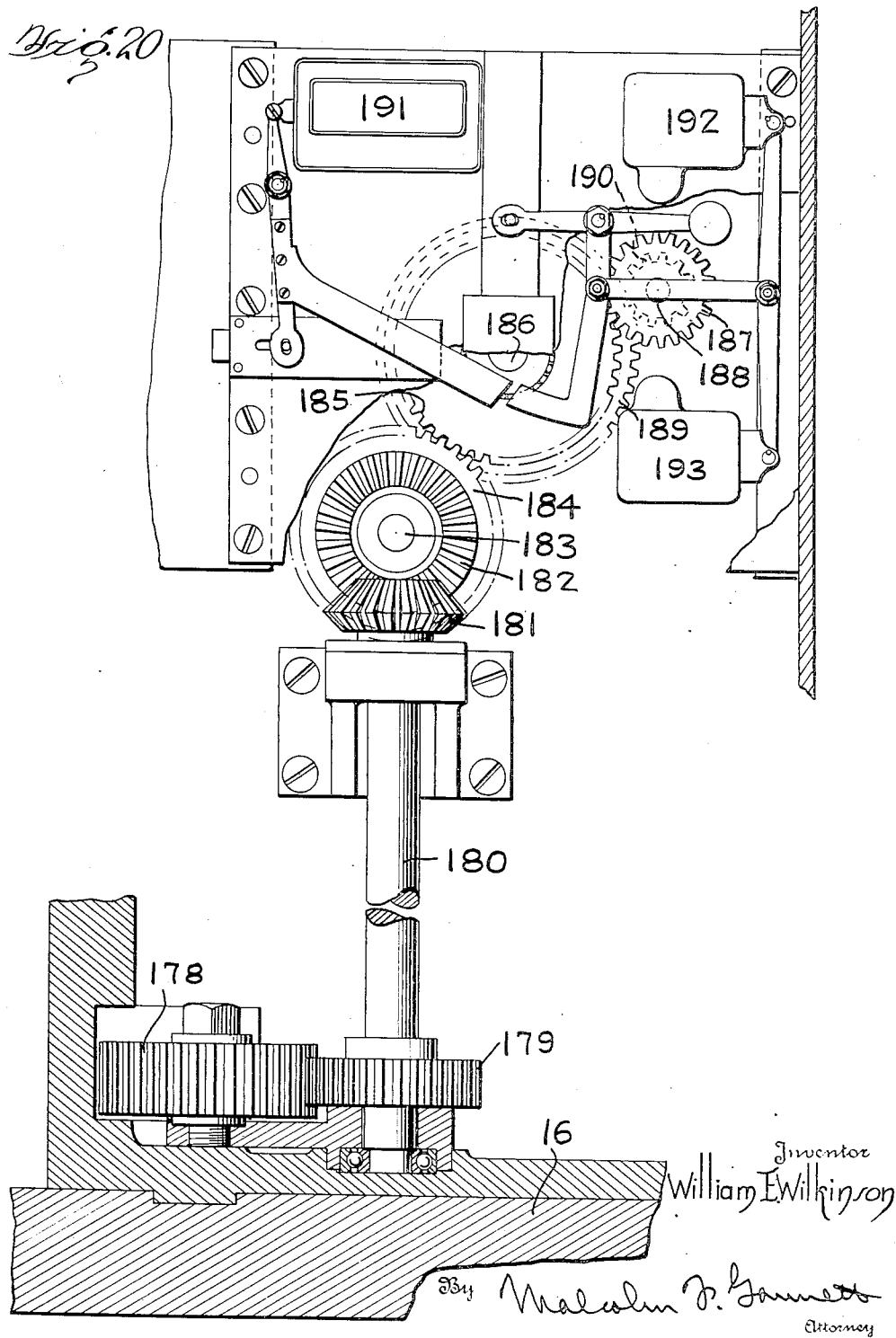

May 25, 1937.  W. E. WILKINSON  2,081,316
VAULT
Filed May 29, 1935   15 Sheets-Sheet 13
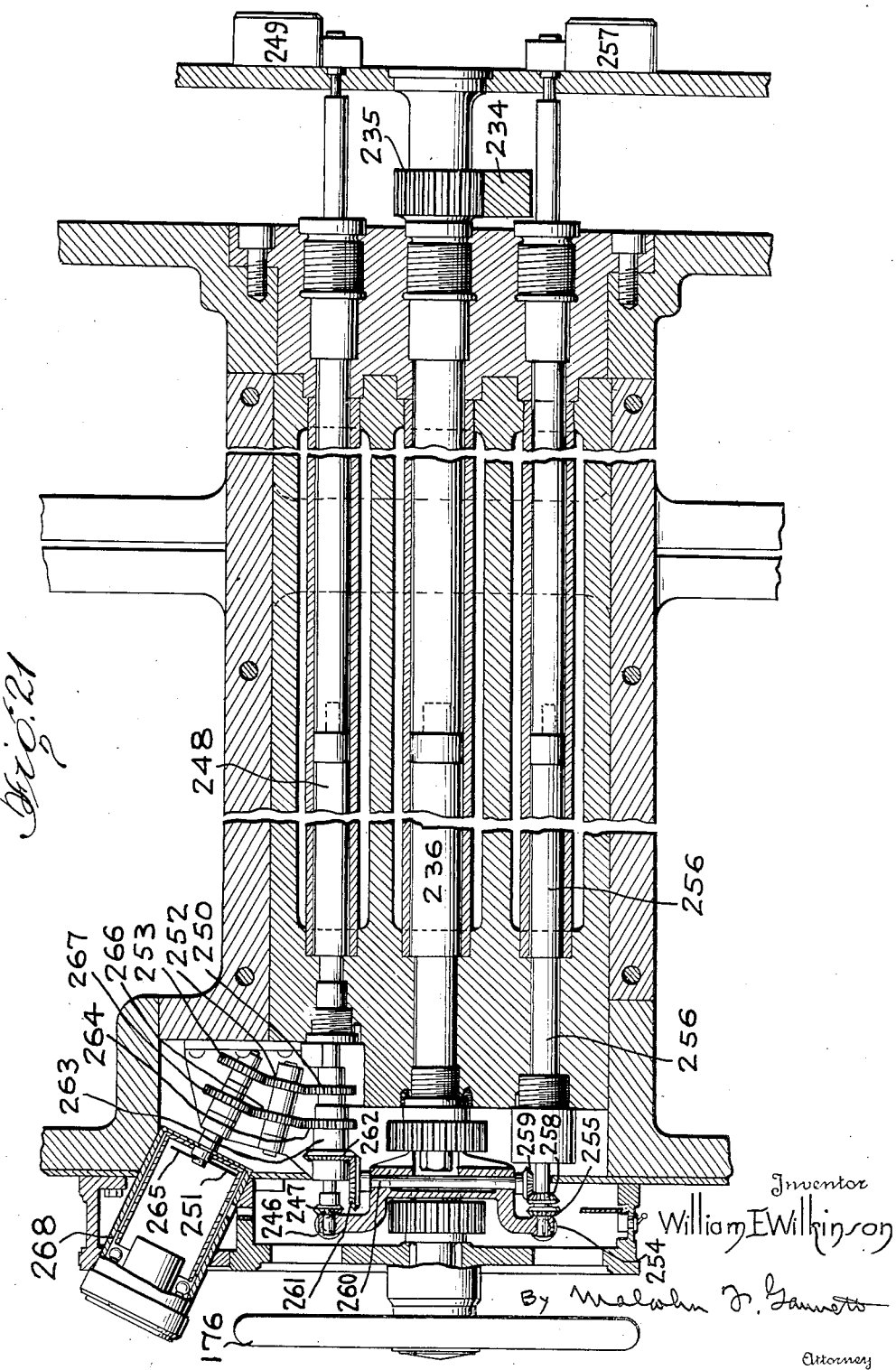

May 25, 1937.  W. E. WILKINSON  2,081,316
VAULT
Filed May 29, 1935  15 Sheets-Sheet 14
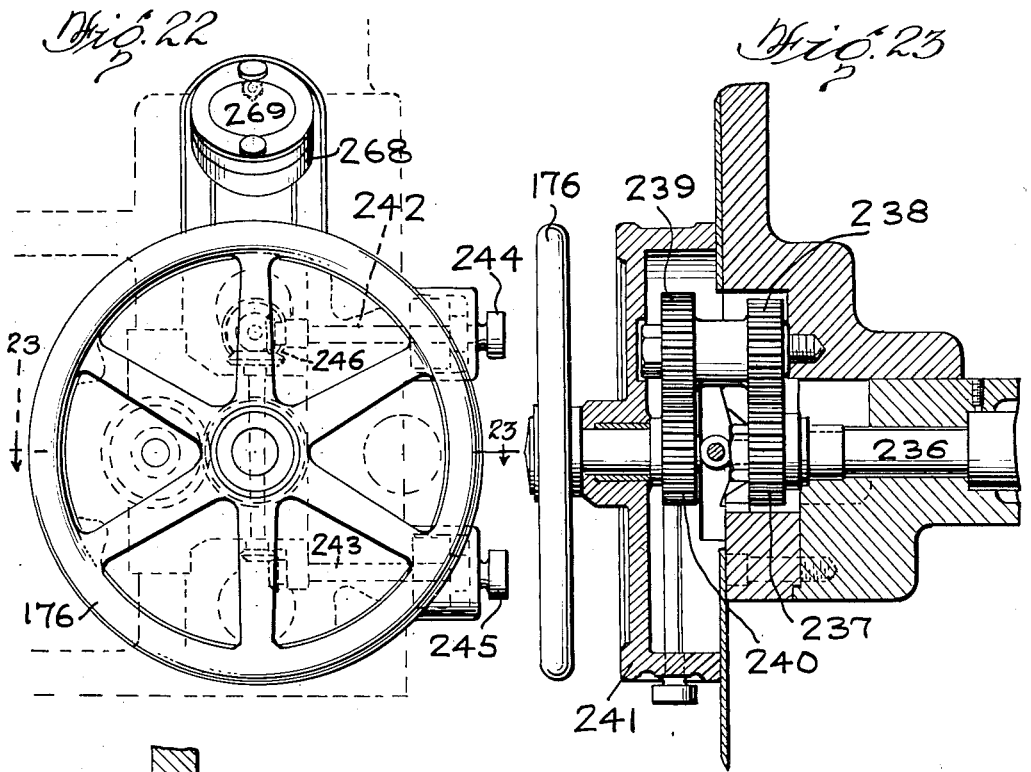
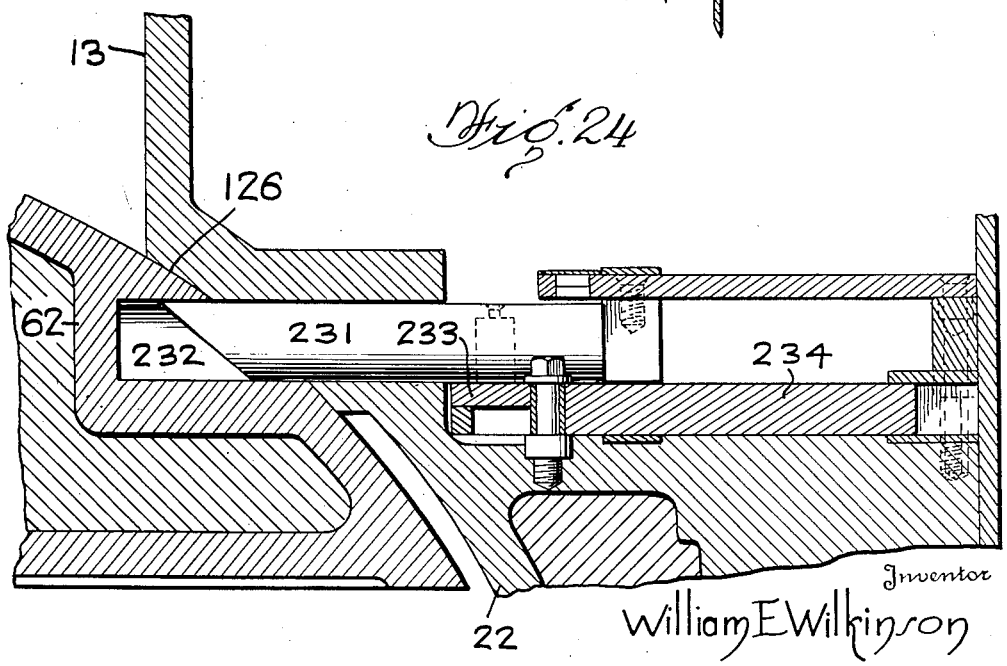
Inventor
William E Wilkinson
By Malcolm F. Garnett
Attorney May 25, 1937.  W. E. WILKINSON  2,081,316
VAULT
Filed May 29, 1935   15 Sheets-Sheet 15

INVENTOR
William E Wilkinson
BY
Malcolm F. Gannett
ATTORNEY

Patented May 25, 1937

2,081,316

UNITED STATES PATENT OFFICE 2,081,316

VAULT

William E. Wilkinson, York, Pa., assignor to York Safe and Lock Company, York, Pa., a corporation of Delaware Application May 29, 1935, Serial No. 24,005

10 Claims. (Cl. 109—1)

This invention relates to vaults, safes and the like and more particularly to closures for vaults or safes, especially closures for large structures and designed to be burglar proof.

An object of the invention is to provide an improved construction of closure adapted to securely seal the vault or safe against violent entry.

Another object of the invention is to provide an efficient construction adapted effectively to resist penetration of the closure wall by a flame and to insulate the interior against fire.

Another object of the invention is to provide an improved construction for large closures which will be very strong and durable and adapted for convenient transportation and erection as well as efficient securing of the parts together, the joints in which construction will be close fitting so as to prevent the entry of explosive liquids and the like.

Another object of the invention is to provide an improved closure for vaults and safes which includes in its construction a rotatable closure member having eccentrically formed surfaces adapted to be wedged into engagement with the housing of the structure and simple and efficient mechanism for operating the closure member.

Another object of the invention is to provide an improved safe or vault of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 1 is a front elevation of a portion of a vault having a closure member constructed according to the present invention, the closure member being shown in closed position;

Fig. 2 is a horizontal section taken approximately on the line 2—2 of Fig. 1;

Fig. 3 is a view similar to Fig. 2, showing the closure member in open position;

Fig. 4 is a vertical section taken on the line 4—4 of Fig. 2;

Fig. 5 is a vertical section taken on the line 5—5 of Fig. 2;

Figs. 6 and 7 are horizontal sections taken on the line 6—7 of Fig. 4, Fig. 6 showing the construction of the parts in the front of the base of the device and Fig. 7 showing the construction of the parts in the rear of the base of the device;

Fig. 8 is a plan of the top of the side frame pieces at the rear of the device showing the manner of mounting the lintel block over the rear portion of the door opening;

Fig. 9 is a plan of the top of the side frame pieces at the front of the device showing the manner of mounting the lintel block over the front portion of the door opening;

Fig. 10 is a front elevation of the structure shown in Fig. 9;

Fig. 11 is an enlarged section of the structure shown in the lower left hand corner of Fig. 4;

Fig. 12 is an enlarged section of one of the seals between the closure member and a side frame piece of the door housing at the front of the device;

Fig. 20 is an elevation with parts in section and other parts broken away of the rear portion of the operating mechanism for the closure member;

Fig. 21 is a vertical longitudinal section of a portion of the locking mechanism for the closure member;

Fig. 22 is a front elevation of the hand wheel and associated parts of the locking mechanism;

Fig. 23 is a horizontal section taken on the line 23—23 of Fig. 22;

Fig. 24 is an enlarged horizontal section of one of the locking bolts at the rear of the closure member;

Fig. 26 is a detail section showing one of the stops for the closure member.

Figure 13:
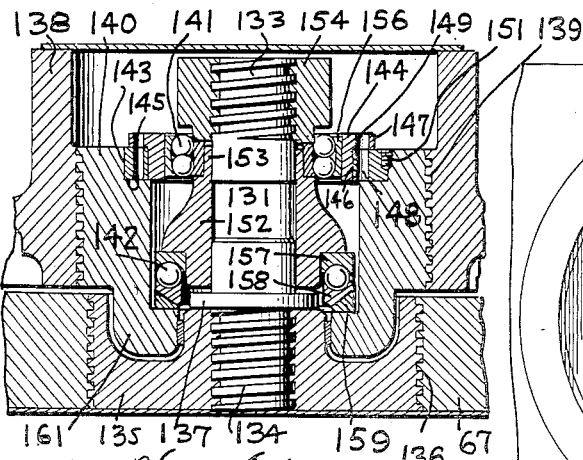
Fig. 13 is an enlarged vertical section of the upper closure member journal and its bearing.

Referring to the drawings, the invention is particularly applicable in a vault or safe, the walls of which, indicated at 11, may be of any well known construction, being formed for example, as is the well known practice, of well armored masonry, cement or metal.

In order that access may be had to the interior of the vault, a closure member, constructed according to the present invention, is mounted in the wall 11.

The closure member comprises a stationary frame constructed in the manner to be hereinafter described and having formed therein an opening, the outer and inner ends of which are indicated at 12 and 13, respectively, (Figs. 2, 3 and 4) and this opening is provided with a revoluble closure member or door 14, a particular form of which will be hereinafter described.

The stationary housing or frame for the door 14 is composed of heavy cast steel sections united together in a manner to be described to provide a strong fluid tight and burglar proof structure.

In constructing the vault and its door, it is customary to provide a sturdy foundation for the closure member, which foundation preferably is constructed of reinforced concrete masonry of suitable type for supporting the door structure.

As shown in Fig. 4, a foundation plate 15 lies on the masonry of the vault at the bottom of the opening. This foundation plate carries the main base frame piece 16 of the door, both base pieces being substantially rectangular in form.

The base frame piece 16 is in the form of a single casting and around its periphery is formed with an upstanding flange 17, the purpose of which will be hereinafter described (see Figs. 4, 5, 6 and 7).

Supported by the base frame piece 16 and extending upwardly therefrom a suitable distance, are side frame pieces 19, 20, 21 and 22 (see Figs. 2, 3, 5, 7, 8, 9 and 10). The side frame pieces extend along both sides of the opening and support a top frame piece 23.

Beneath the opening at the front of the door and spanning the space between side frame pieces 19 and 21, is a block 24, (Figs. 4, 6 and 11).

Spanning the space between the side frame pieces 20 and 22 at the lower rear portion of the opening, are blocks 25 and 26, the block 26 being carried by and also being mounted in the block 25 in the manner to be hereinafter described (see Figs. 4 and 7).

Connecting the top of the side frame pieces 19 and 21 at the front of the opening, is a block or lintel 27 (see Figs. 4, 9 and 10), and connecting the top of the side frame pieces 20 and 22 at the rear of the opening, is a block or lintel 28.

All of the parts of the door frame are interlocked and permanently secured together in a novel manner.

As shown in Figs. 4, 5, 6 and 7, the base frame piece 16 may be formed of hard material, such as cast steel. The bottom of said base is formed with a plurality of radially disposed ribs 30, and the spaces between said ribs may be filled with a heat resistant material 31.

With a view to providing means for permanently assembling the several parts of the housing and for interlocking them tightly together, the base frame piece 16 is formed around its periphery and at a point inwardly a suitable distance from the upstanding flange 17, with a groove 32 of a size to accommodate a tongue 33 depending from the bottom of each of the side frame pieces 19, 20, 21 and 22, and the blocks 24 and 25. Figs. 4 and 11 illustrate the manner in which the tongue and groove connection is formed between the blocks 24 and 25 and the base frame piece 16, and it will be understood that a similar form of construction is used in connecting the lower edges or bottoms of the side frame pieces with the base frame piece.

The groove 32 is formed with a recessed portion 34, as shown best in Fig. 11, and this recessed portion is filled with a suitable metallic paste-like substance, 35 which, upon hardening, seals the bottom peripheral joint between the door frame pieces above described.

Also, as shown in Figs. 4 and 5, the tops of the door frame sections are similarly interlocked and sealed. A groove 36 is formed in the top frame piece 23 adjacent the periphery thereof, and an upstanding tongue 37 is formed on the upper surfaces of the side frame pieces 19, 20, 21 and 22, and the front and rear lintels or blocks 27 and 28, respectively, (see also Fig. 10), said tongue fitting into said groove in the manner heretofore described and illustrated in Fig. 11, and a seal 38 also being provided, similar to the filler 35 heretofore described.

Referring now to Figs. 4 and 9, the outer face of the lintel block 27 is notched, as indicated at 57 (Fig. 4) for the reception of a flange 58 depending from the periphery of the top frame piece 23. Screws 59 are employed for fastening the lintel block 27 to the top frame piece 23.

In order to prevent undue displacement of the lintel 27 from the side frame pieces 19 and 21, the opposite ends of said lintel are formed with dove tail slots 60, and correspondingly formed slots 101 are provided in the adjoining edges of the side frame pieces 19 and 21, respectively. Dove tail keys 102 are mounted in said slots 60 and 101, as shown in Figs. 9 and 10.

Likewise, the outer face of the lintel block 28 is notched, as indicated at 103 (Figs. 4 and 8) for the reception of a flange 104 depending from the periphery of the top frame piece 23. Screws 105 are employed for fastening the lintel block 28 to the top frame piece 23.

Also, in order to prevent undue displacement of the lintel 28 relative to the side frame pieces 20 and 22, the opposite ends of said lintel are formed with vertical dove tail slots 106, and correspondingly formed slots 107 are provided in the adjoining edges of the side frame pieces 20 and 22, respectively. Dove tail keys 108 are mounted in said slots 106 and 107, as shown in Fig. 8.

Referring now to Figs. 2, 3, 6 and 7, the adjoining edges of the side frame pieces are also interlocked and sealed.

Side frame piece 19 is formed along the edge adjacent side frame piece 20 with a relatively broad groove 39, which terminates at the inner wall of said side frame piece in a comparatively narrow, but deeper groove 40.

The surface of side frame piece 20 which abuts side frame piece 19 is formed with a relatively broad tongue 41 which is mounted in groove 39 and a comparatively narrow tongue 42 which is disposed in groove 40.

The construction of the tongue 41 and groove 39 is such that when the side frame pieces are assembled there will be an elongated space therebetween, which space is filled with a suitable filler 43 which will render the joint fluid tight.

Also, side frame piece 22 is formed along the edge adjacent side frame piece 21, with a relatively broad groove 44, which terminates at the inner wall of said side frame piece in a comparatively narrow, but deeper groove 45.

The surface of side frame piece 21 which abuts side frame piece 22 is formed with a relatively broad tongue 46 which is mounted in groove 44 and a comparatively narrow tongue 47 which is disposed in groove 45.

The construction of the tongue 46 and groove 44 is such that when the side frame pieces 21 and 22 are assembled there will be an elongated space therebetween, which space is filled with a suitable filler 48 to render the joint fluid tight.

Furthermore, in order to rigidly interlock the side frame pieces together, the outer edge portion of side frame piece 20 at a point adjacent the interlocked joint above described, is formed with a notch or cut away portion 49 for the reception of a flange 50 with which side frame piece 19 is provided.

Likewise, side frame piece 21 is formed with a cut away portion or notch 51, similar to the notch 49, and side frame piece 22 is formed with a flange 52 which is mounted in notch 51.

The manner of constructing the side frame pieces provides means whereby these sections of the door frame can be readily shifted while being assembled in the vault and when properly positioned will be firmly interlocked together.

After being properly assembled, the sections of the door frame are further secured together by screws 53, as indicated in several figures of the drawings.

When the parts of the device are being assembled, the side frame pieces are lowered in position on to the base frame piece 16 and after the door 14 has been assembled within the side frame pieces, the top frame piece 23 is lowered in position on the side frame pieces.

When the parts of the door frame are assembled, a substantially cylindrical opening will be formed, as shown in Fig. 2, for the door 14.

The side frame pieces 19, 20, 21 and 22 of the door frame are preferably formed of composite material. The walls of said frame pieces are formed of hard material, such as cast steel, and these walls are of such thickness as to provide a strong, rigid structure. Also cast integrally with the walls of the side frame pieces, are pins 54 which extend inwardly from said walls a suitable distance and terminate in enlarged portions or knobs 55, (see Figs. 2 and 3).

As will be understood, the cast steel walls of the side frame pieces, thus constitute tubes or jackets, and these are filled with heat resistant material 56 which is reinforced by the pins 54. The material 56 within the side frame pieces 19, 20, 21 and 22 is adapted to offer a great resistance to heat or to a flame. In constructions in which the flame proof and heat resistant properties of the door are of particular importance, it is desirable to form the side frame pieces in the manner illustrated, with the body of heat resistant material much thicker than the steel walls of the tubular jacket which surround it. Any type of heat resistant material may be used, such as a mixture of suitable metals. Such material is poured into the tubular jackets of the side frame pieces in a molten state and permitted to slowly harden. When an attempt is made to penetrate a door of this type by means of a blow torch, the heat will be carried off too rapidly to enable the torch to be effectively used in sufficiently melting the mass of material quickly to form an opening of the necessary size.

The particular type of door illustrated includes a pair of spaced front and rear sections 61 and 62 which, as shown, consist of tubes or jackets of hard material, such as steel, filled with heat resistant material 63 and reinforced by pins 64 which extend inwardly from the side walls thereof a suitable distance and terminate in enlarged portions or knobs 65.

The shape of the sections 61 and 62 may be substantially that of sections of a cylinder from which the central portion has been cut away along the lines of two planes extending throughout the length of the cylinder. There is thus formed a door comprising two members which may be rotated on a single axis and which have formed therebetween a large air space or passageway 66 which serves when the door is in open position, as shown in Fig. 3, to connect the ends 12 and 13 of the opening through the housing and which serves when the door is closed, as shown in Fig. 2, to increase the heat insulating properties of the door.

In the construction shown, the axis of the door is vertically disposed. The sections 61 and 62 of the door are connected by means of a circular cap plate 67 and a circular base plate 68.

As shown in Fig. 4, at diametrically opposite sides, the cap plate 67 is undercut, as at 69 and 70, to form two shoulders 71 and 72 against which respectively abut the upper inner flat faces of the two door sections 61 and 62.

Also, at diametrically opposite sides, the base plate 68 is formed with upstanding ribs 73 and 74, against which abut the lower inner notched portions 75 and 76 of the two door sections 61 and 62, respectively.

Along the top of the upper outer edge portion of the door section 61, there is formed an upstanding rib or tongue 77 which is disposed in a correspondingly formed groove 78 constructed on the underside of the front outer portion of the cap plate 67.

Also, along the top of the upper outer edge portion of the door section 62 there is formed an upstanding rib or tongue 79 which is disposed in a correspondingly formed groove 80 constructed on the underside of the rear outer portion of the cap plate 67.

The outer lower edge portion of the front door section 61 extends downwardly in the form of a flange 81 which terminates at a point below the inner lower edge portion of said section. The flange 81 is further formed with a depending rib or tongue 82 which is disposed in a correspondingly formed groove 83 in the base plate 68 adjacent the front edge thereof, as shown best in Fig. 11.

The groove 83 is formed with a recessed portion 84 and this recessed portion is filled with a suitable metallic paste-like substance 85 which, upon hardening, seals the joint between the front door section 61 and the base plate 68.

Similarly, the outer lower edge portion of the rear door section 62 extends downwardly in the form of a flange 86 which terminates at a point below the inner lower edge portion of said section. The flange 86 is further formed with a depending rib or tongue 87 which is disposed in a correspondingly formed groove 88 constructed in the base plate 68 adjacent the rear edge thereof. Furthermore, as shown in Fig. 4 the joint between the door section 62 and the base plate 68 is formed with a filler 85 similar to the filler 85 shown in the enlarged view, Fig. 11.

In order to assemble the several sections of the door, the base plate 68 is first positioned, as shown in Fig. 3, that is, the door open position. The two sections 61 and 62 are then lowered into place, with the tongues 82 and 87, respectively disposed in the grooves 83 and 88 and the upstanding ribs 73 and 74 disposed in the notched portions 75 and 76 of the door sections 61 and 62 respectively. With the parts thus positioned the inner face of the flange 81 abuts a shoulder 89 on the base plate 68, and the inner face of the flange 86 abuts a shoulder 90 on said base plate.

Screws 91 and 92 are used for securing the lower outer portions of the door sections 61 and 62 to the base plate 68, as shown in Fig. 4. The screws 91 can readily be applied from the exterior of the door, and the screws 92 can be applied from the interior of the door.

After the two door sections 61 and 62 have been positioned on the base plate 68, the cap plate 67 can be lowered into position on top of said door sections. In such position the parts will be disposed as shown in the upper part of Fig. 4, with the tongues 77 and 79, disposed in the grooves 78 and 80, respectively.

The cap plate 67 may now be securely fastened to the door sections 61 and 62, by means of screws 93, as shown in Fig. 4.

At diametrically opposite sides, the periphery of the cap plate 67 is formed with dove tail grooves 94 and 95.

The inner edge portion of the upper front block or lintel 27 is formed with a dove tail rib 96 which is adapted to engage in the groove 94.

Likewise the inner edge portion of the upper rear block or lintel 28 is formed with a dove tail rib 97 which is adapted to engage in the groove 95.

The front portion of the base plate 68 is formed with a dove tail groove 111 in which is mounted a correspondingly shaped rib 112 formed on the inner portion of the lower front block 24.

In Fig. 11, there is shown an enlarged view of the dove tail tongue and groove connection at the lower front end of the door. It will be understood that the other dove tail joints at the top of the door structure heretofore described are similarly formed.

As shown clearly in Fig. 11, a slight clearance is provided between the stationary dovetail tongue and the rotatable dovetail groove of the door, so that when the door is rotated the parts will not bind. By utilizing dove tail joints it will be understood that lateral shifting movements of the parts relatively to each other will be prevented since the inclined surfaces of the tongues will come into engagement with the inclined surfaces of the grooves should any perceptible lateral movement take place.

However, in order to seal the joints between the blocks 24 and 27 and the door, suitable packing strips 113 and 114 are mounted respectively in said blocks (see Figs. 4 and 11).

As shown in Figs. 4, 6 and 11, there are blocks 115 mounted on the base frame piece 16 to the rear of the block 24.

The lower rear block 25 is substantially L-shaped in cross section, as shown in Fig. 4. The block 25 is keyed to the base frame piece 16 by means of a tongue 117 which is disposed in a correspondingly formed groove 118 in the base frame piece 16. The construction of the tongue 117 and groove 118 is similar to that shown underneath the block 24 in the enlarged section (Fig. 11), and a similar filler is employed to seal the joint therebetween as has been heretofore described.

As shown best in Fig. 7, block 26 fits into block 25 in order to complete the contour of the rear lower portion of the housing. It is necessary to make these fillers in two parts so that the screws 91 can be mounted in the lower rear portion of the door. When the parts are being assembled the block 26 is not positioned until after the screws 91 have been applied. After block 26 has been positioned in block 25, it is firmly secured thereto by screws 119, (see Figs. 4 and 7).

In Figs. 2 and 3, the center of rotation of the door 14 is indicated at 123. The numeral 124 indicates the center of curvature of the arcuate face of the front door section 61, and the numeral 125 indicates the center of curvature of the arcuate face of the rear door section 62. It will be understood that the radius of the outer curved or outer walls of the two door sections 61 and 62 is the same, but when the two door sections have been assembled in position, the center point 124 is on one side of the axial center of the door and the center point 125 is on the opposite side of the center of the door.

The vertical arcuate inner walls of the rear frame pieces 21 and 22 are formed with vertically disposed arcuate bearing surfaces 126, and the vertical arcuate inner walls of the front side frame pieces 19 and 21 are formed with vertically disposed arcuate bearing surfaces 121. The radius of curvature of the bearing surfaces 121 coincides with the center of curvature of the outer door section 61, namely, the point 124 above referred to, and the radius of curvature of the bearing surfaces 126 coincides with the center of curvature of the inner door section 62, namely, the point 125 above referred to. As has been described, the top and bottom portions 67 and 68 comprise circular plates between which are supported the front and rear door sections 61 and 62, respectively. It has also been described that the outer arcuate surfaces of the door sections 61 and 62 are formed segments of a true circle. However, since the center of curvature of said sections 61 and 62 are offset with respect to the axial center of the door, said door sections are eccentrically mounted on the top and bottom plates 67 and 68. The arcuate bearing surfaces 121 and 126 of the housing are also formed segments of a true circle, however, since the center of curvature of said bearing surfaces are offset with respect to the axial center of the said bearing surfaces are eccentrically disposed with respect to the rotating axis of the door. Thus, when the door is rotated from closed to open position, the door sections 61 and 62 will be moved away from engagement with the bearing surfaces 121 and 126, respectively of the side frame pieces 19, 20, 21 and 22, and vice versa, when the door is rotated from open to closed position, said door sections will be gradually moved into engagement with the bearing surfaces 121 and 126.

The parts are so constructed that the rear door section 62 will snugly fit the bearing surfaces 126 of the rear side frame pieces 20 and 22, Figs. 2 and 3. However, in order to provide a tight seal between the front door section 61 and the bearing surfaces 121 of side frame pieces 19 and 21, at a point adjacent the front opening 12 of the vault door, sealing strips 122 are provided, as shown best in Fig. 12. This construction is such that the entire periphery of the front door opening is made fluid tight by the packing strips 113 and 114 and the sealing strips 122.

For the purpose of pivotally supporting the door 14 in its frame, the cap plate 67 carries an upper journal 131 and the base plate 68 supports a lower journal 132. The journals 131 and 132 operate to center the door in a manner to be hereinafter more fully described.

As shown best in Fig. 13, the upper journal 131 may comprise a cylindrical body having its upper portion threaded as indicated at 133 and its lower portion formed with threads 134.

The threaded portion 134 of the journal 131 is adapted to be mounted in a member 135. The member 135 is circular in form and its threaded periphery is mounted in a correspondingly formed threaded opening 136 formed in the cap plate 67 of the door.

The journal 131 is formed, directly above the threaded portion 134 thereof, with a flange 137 which bears against the upper face of the member 135.

The top frame piece 29 is formed with a circular upstanding flange 138 which surrounds threaded opening 139 formed centrally in said top frame piece.

Mounted in the opening 139 and supported by the threads thereof, is a member 140 which supports upper and lower ball bearings 141 and 142, respectively.

The upper bearing 141 includes a pair of rings 143 and 144. The ring 143 is mounted in a notch or groove 145 formed in the bearing supporting member 140, and said ring is formed with an eccentric opening 146 therethrough.

The ring 144 has a main body portion which snugly fits the opening 146 of ring 143, and said ring 144 is formed with an outwardly extending flange 147 which rests upon the top of the ring 143. Ring 144 is mounted in ring 143 so that one ring can be turned relatively to the other. For this purpose the rings 143 and 144 are formed with a plurality of openings 148 and 149, respectively, which openings are adapted to be alined so as to receive pins by means of which said rings are moved in the bearing supporting member 140.

Figure 14:
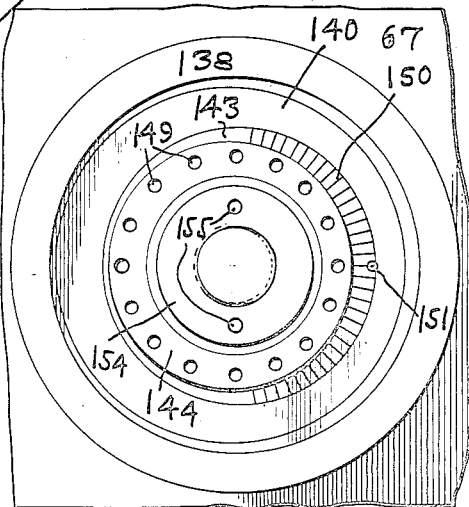
Fig. 14 is a plan of the structure shown in Fig. 13, the top cover plate being omitted.

Also, the upper surface of the ring 143 is formed, as shown in Fig. 14, with serrations 150 adapted to receive a suitable tool by means of which said ring can be rotated.

After the parts of the bearing have been properly positioned, the ring 143 is locked in position by means of set screw 151, shown in Figs. 13 and 14.

Mounted on the journal 131 and disposed between the bearings 141 and 142 is a collar 152 which is adapted to maintain said bearings in correctly spaced position.

The upper end of the collar 152 is reduced somewhat in diameter as indicated at 153, so as to support the bearing 141. Mounted on the upper threaded portion 133 of the journal 131 is a nut 154 which bears against the top of the bearing 141 in the manner shown in Fig. 13.

As shown in Fig. 14, the nut 154 is round or circular in plan and in order that said nut may be rotated it is provided with a plurality of openings 155 for the reception of a spanner wrench or other suitable tool.

As shown in Fig. 13 the bearing 141 includes a plurality of balls which are carried in a ring 156 mounted in the ring 144 heretofore described. The lower flanged end 153 of the nut 154 also engages the balls of the bearing 141 to retain the same in position.

The lower bearing 142 is adapted to take the end thrusts of the door and for this purpose this bearing includes a plurality of rings 157, 158 and 159. Interposed between the rings 157 and 158 is a series of balls. The lower edge portion of ring 158 is bevelled, as shown in Fig. 13 and this inclined surface rests upon a correspondingly formed upper surface of the ring 159. The ring 157 is disposed in a suitable notch 160 formed in the lower portion of the collar 152, while the ring 159 is supported on an inwardly extending flange 161 formed on the member 140.

Referring to Figs. 4, 5, 15, and 16, the base frame piece 16 is formed with a central upstanding boss 161 which constitutes the bearing support for the lower journal 132 of the door.

The base plate 68 of the door is formed with a central threaded opening 162 in which is mounted a circular member 163.

Formed centrally through the member 163 is an opening 164 in which is mounted the journal 132, and also formed in the member 163 are other openings 165 which latter openings are closed at the top by plugs 166.

The journal 132 is preferably made with three diameters, a lower portion 167, an intermediate portion 168 which is slightly larger in diameter than the lower portion 167, and an upper portion 169, which is slightly larger in diameter than the intermediate portion 168.

Figure 15:
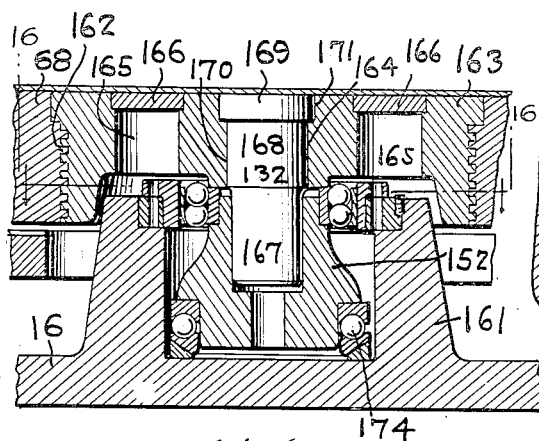
Fig. 15 is an enlarged vertical section of the lower closure member journal and its bearing.
Figure 16:
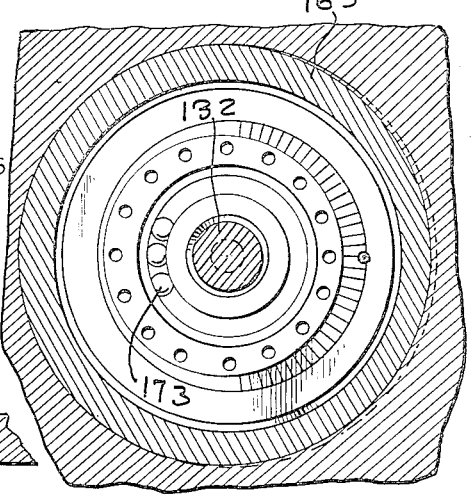
Fig. 16 is a horizontal section taken on the line 16—16 of Fig. 15.

Likewise, the opening 164 in the member 163 is formed with two diameters, a lower portion 170 corresponding in diameter to the size of the intermediate portion 168 of the journal 132, and an upper portion 171 corresponding in diameter to the upper portion 169 of said journal. As shown in Fig. 15, the lower end 167 of the journal projects below the member 163.

The journal 132 is supported by upper and lower ball bearings 173 and 174 which are mounted in the boss 161. These bearings are similar in construction to the bearings 141 and 142 heretofore described, and the openings 165 are provided in the member 163 so that access may be had to the upper bearing 173 for adjusting the eccentric rings thereof in the manner pointed out before in the description of the bearing 141. Therefore, the description given above covering the detail construction of the upper bearings also applies to the lower bearings, it being understood that the lower end 167 of the journal 132 is supported by the collar 152 of the lower bearings.

The purpose of providing the eccentric rings 143 and 144 of the bearings for the journals 131 and 132 is to permit shifting of the door 14 within the housing during the construction of the device, so that said door will rotate properly so as to cause the front door sections 61 to tightly fit the seals in the bearings 121. The rotary movement of the door has been described and in order to obtain such rotation of the door, it is necessary to provide means for properly positioning and mounting the door in the housing, with respect to the inner walls of the side frame pieces 19, 20, 21 and 22. By utilizing adjustable bearings of the type described above, it will be understood that the door can readily be correctly positioned, and when so positioned will remain in such position indefinitely, due to the provisions of locking the adjustable eccentric rings 143 and 144.

In case the door 14 is locked, by removing the upper bearing assembly, access may be had to the interior of the door for the purpose of removing the lower bearing assembly. In this way the lower bearing can be repaired or replaced.

The door is adapted to be rotated from closed to open position and vice versa, through an angle of approximately 90°, and suitable manually operable mechanism is provided for rotating the door, and also for locking the door in closed position.

Referring to Fig. 1, at the left side of the door there is shown mechanism including a hand wheel 175 for operating the door rotating mechanism, and at the right there is shown another hand wheel 176 for operating the door locking mechanism.

The detail construction of the door rotating mechanism is shown in Figs. 7, 17, 18, 19 and 20, and the detail construction of the operating mechanism for the door locks is shown in Figs. 21, 22, 23, 24 and 25.

Referring now to Fig. 7, the base plate 68 of the door 14 is formed around a portion of its periphery, with a gear 177, the teeth of which are in meshing relationship with the teeth of a gear 178 adjustably mounted in the rear portion of the base of the device.

As shown in Fig. 20, the gear 178 is in meshing relationship with a gear 179 on the lower end of a vertically disposed shaft 180.

The upper end of shaft 180 carries a bevel gear 181 which is in meshing relationship with a bevel gear 182 on a shaft 183. Also mounted on shaft 183 is a gear 184 which is in meshing relationship with a gear 185 on a shaft 186. Gear 185 in turn meshes with a gear 187 on a shaft 188. (See also Fig. 17.) Shaft 186 also carries a gear 189 which is in meshing relationship with a gear 190 on shaft 188.

Associated with gears 190, 187, 189 and 185 is suitable locking mechanism 191, 192 and 193 of any approved type. These locks and the mechanism controlled thereby operate to render it impossible to rotate the door except when said locks have been set to release their associated mechanisms. Lock 191 may be a time lock of usual type, while locks 192 and 193 may be combination locks operable in the manner hereinafter described.

Figure 17:
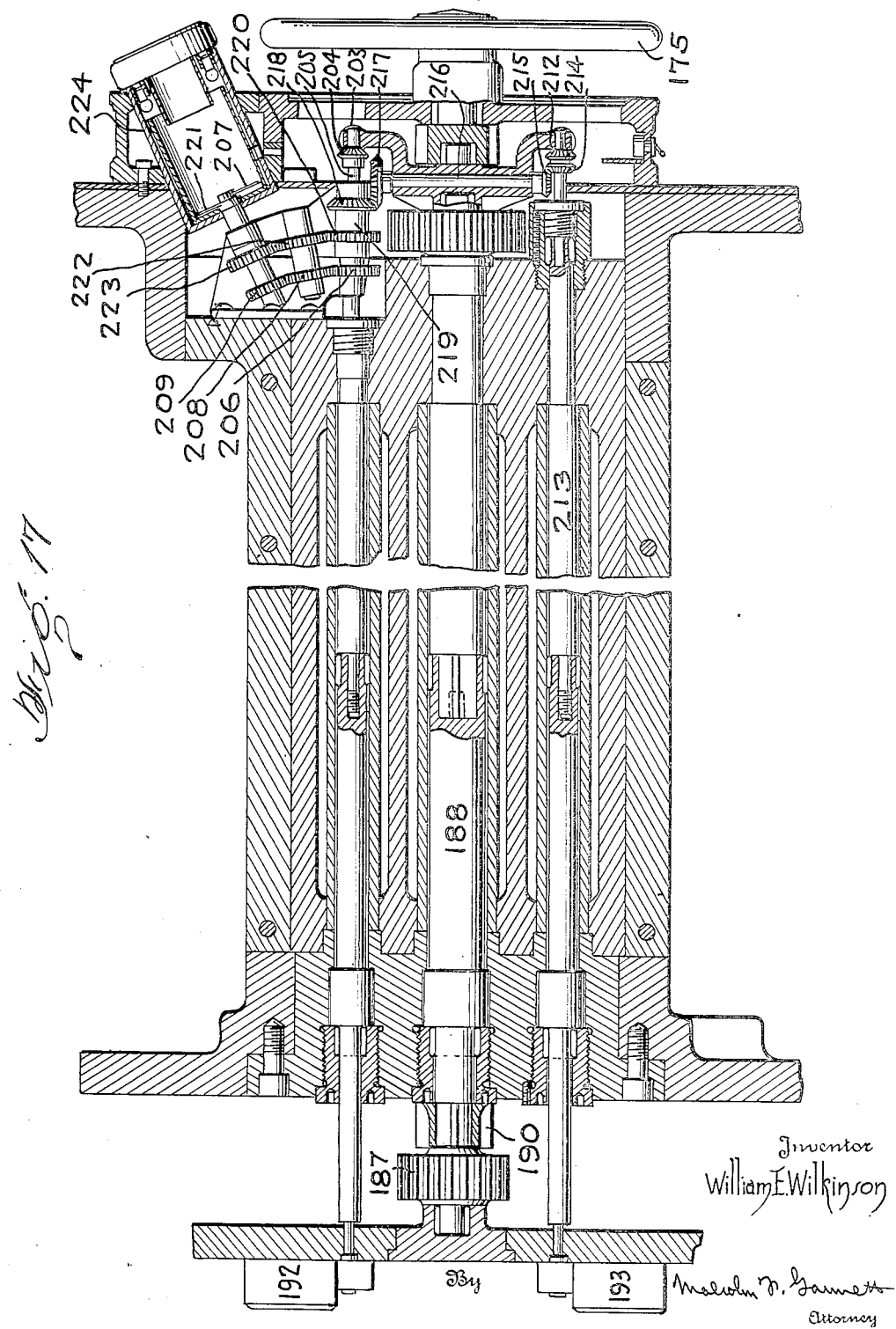
Fig. 17 is a vertical longitudinal section of a portion of the operating mechanism for the closure member.
Figure 18:
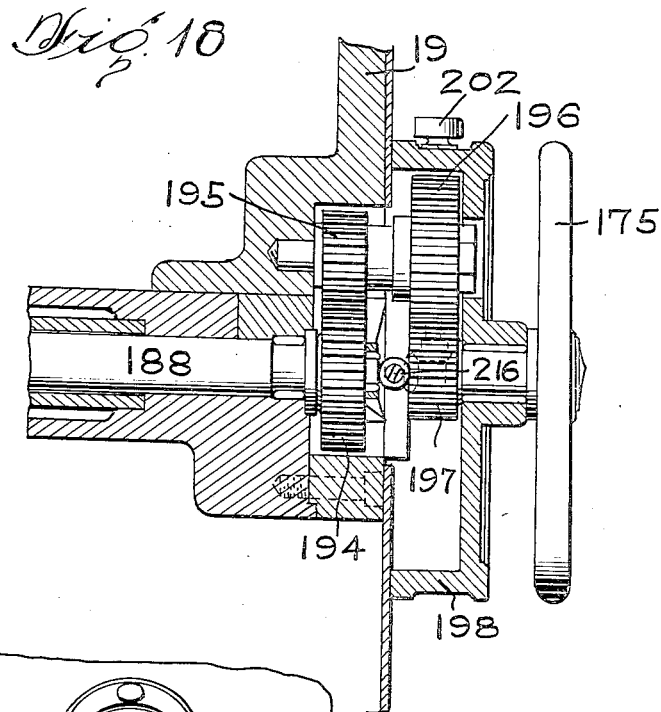
Fig. 18 is a horizontal section of the hand wheel and the mechanism associated therewith shown at the right hand in Fig. 17.

As shown in Figs. 5, 17 and 18, the shaft 188 extends from the rear of the device to a point adjacent the front wall of side frame piece 19, where it is connected to the hand wheel 175 by gears 194, 195, 196 and 197.

The hand wheel 175 is journalled in a housing 198 mounted on the front wall of the device.

Also journalled in the housing 198 are two shafts 199 and 200 (see Fig. 19), which are respectively provided with knobs 201 and 202 disposed on the exterior of said housing so that said shafts can be operated.

The inner end of shaft 199 carries a bevel gear 204 on a shaft 205. Shaft 205 overlies the door operating shaft 188 heretofore referred to and said shaft 205 extends to the rear of the housing where it is connected to the mechanism of lock 192.

Mounted on shaft 205 is a gear 206 which drives a pointer 207 through gears 208 and 209.

Likewise, the inner end of shaft 200 carries a bevel gear 211 which is in meshing relationship with a bevel gear 212 on a shaft 213. Shaft 213 parallels the shaft 188, being disposed thereunder as shown in Fig. 5, and said shaft 213 extends to the rear of the housing where it is connected to the mechanism of lock 193.

At a point adjacent the bevel gear 212, shaft 213 is provided with another bevel gear 214 which is in meshing relationship with a bevel gear 215 on a vertically disposed shaft 216. Another bevel gear 217 is mounted on top of shaft 216, and gear 217 meshes with a bevel gear 218 on a sleeve 219 loosely mounted on shaft 205. The sleeve 219 carries a gear 220 which operates a pointer 221 through gears 222 and 223.

Figure 19:
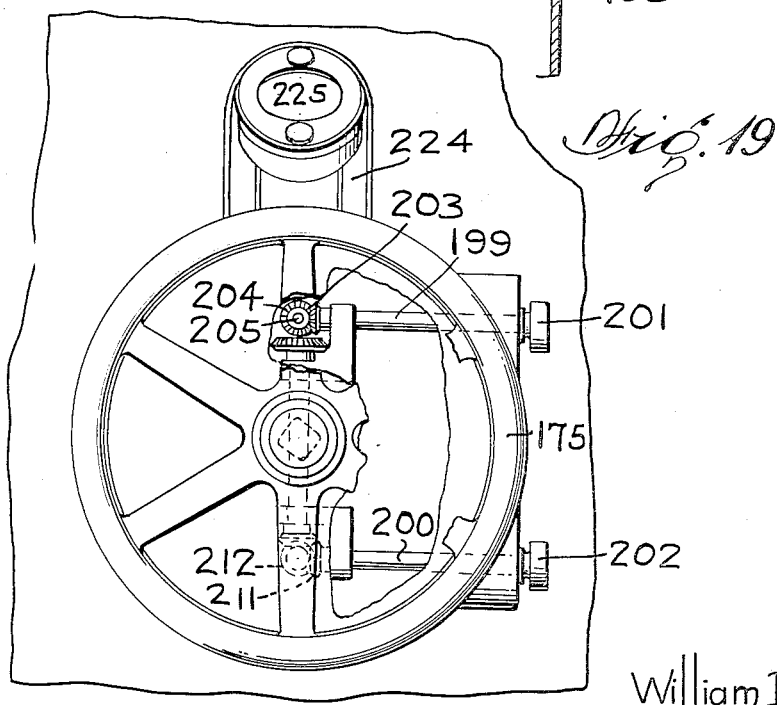
Fig. 19 is a front elevation, with parts broken away to show the underlying structure, of the hand wheel shown at the right in Fig. 17.

Pointers 207 and 221 are disposed in a housing 224 having a sight opening 225 at its outer end, through which an operator may observe the relative positions of said pointers (see Figs. 17 and 19).

When it is desired to rotate the door 14, and assuming that time lock 191 has operated to release the mechanism controlled thereby, the operator first actuates knobs 201 and 202 to turn the pointers 207 and 221 to predetermined positions. This action releases the locks 192 and 193 shown in Fig. 20 and permits rotation of gears 185 and 189. After the pointers 207 and 221 have been properly set and the locks 192 and 193 thereby released, the operator can turn wheel 175, which action effects rotation of the door by reason of the fact that gear 177 on the bottom of the door will be rotated by the gearing operatively connected therewith and heretofore described.

In order to limit the rotational movement of the door the base frame piece 16 is formed with two upstanding lugs 226 and 227 (see Figs. 7 and 26), and the base plate 68 of the door is formed with a depending lug 228, which is adapted to abut the stop lugs 226 and 227. Since the door is adapted to be rotated through an arc of approximately 90°, the stop lugs 226 and 227 are so positioned as to limit the movement of the door in either direction beyond such degree when engaged by the door stop lug 228.

Figure 25:
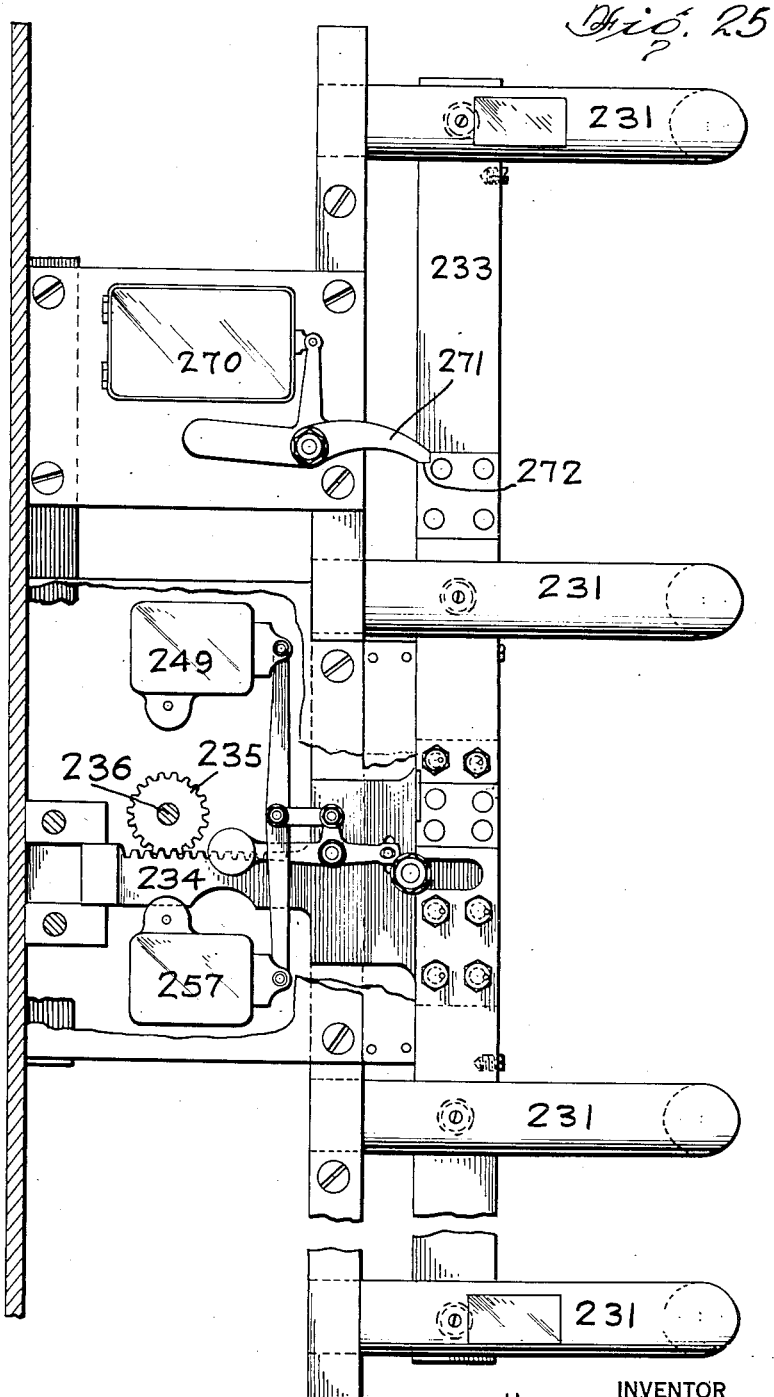
Fig. 25 is an elevation, with parts broken away, of the locking bolts and their associated parts, looking from the rear of the closure member.

It is desirable to also provide means for securely locking the door 14 in its closed position, and in the present instance such locking means consist of locking bolts 231 mounted adjacent the interior of the vault upon the side frame piece 22 and adapted to extend into recesses 232 in the door member 62 when the door is in its closed position, as shown in Figs. 2 and 24. Any number of bolts 231 which meet the requirements of a particular case may be employed. As shown in Fig. 25, in the instant case four locking bolts are utilized.

Suitable mechanism, which in the present instance includes hand wheel 176 may be provided in order to operate the bolts 231, and as a general rule the bolt actuating mechanism will be provided with a time controlling device of any usual type which will render it impossible to actuate the bolts except at predetermined times.

As shown in Fig. 25 the locking bolts 231 are mounted on a frame or carriage 233, which also supports a rack bar 234. The teeth of the rack bar 234 are in meshing relationship with the teeth of a gear 235 on the inner end of a shaft 236.

As shown in Figs. 5, 21 and 23, the shaft 236 extends from the rear of the device to a point adjacent the front wall of side frame piece 21, where it is connected to the hand wheel 176 by gears 237, 238, 239 and 240.

The hand wheel 176 is journalled in a housing 241 mounted on the front wall of the device.

Also journalled in the housing 241 are two shafts 242 and 243 (see Fig. 22), which are respectively provided with knobs 244 and 245 disposed on the exterior of said housing so that said shafts can be operated.

The inner end of shaft 242 carries a bevel gear 246 which meshes with a bevel gear 247 on a shaft 248. Shaft 248 overlies the bolt actuating shaft 236 and said shaft 248 extends to the rear of the housing where it is connected to the mechanism of a lock 249.

Mounted on shaft 248 is a gear 250 which drives a pointer 251 through gears 252 and 253.

The inner end of shaft 243 carries a bevel gear 254 which is in meshing relationship with a bevel gear 255 on a shaft 256. Shaft 256 parallels the shaft 236, being disposed thereunder as shown in Figs. 5 and 21, and said shaft 256 extends to the rear of the housing where it is connected to the mechanism of a lock 257.

At a point adjacent the bevel gear 255, shaft 256 is provided with another bevel gear 258 which is in meshing relationship with a bevel gear 259 on a vertically disposed shaft 260. Another bevel gear 261 is mounted on the upper portion of shaft 260, and gear 261 meshes with a bevel gear 262 on a sleeve 263 loosely mounted on shaft 248. The sleeve 263 carries a gear 264 which operates a pointer 265 through gears 266 and 267.

Pointers 251 and 265 are disposed in a housing 268 having a sight opening 269 at its outer end, through which an operator may observe the relative positions of said pointers (see Figs. 21 and 22).

A time locking mechanism 270 is disposed in the rear of the housing and operatively associated with the locking bolts 231. The time locking mechanism 270 includes a latching device having an arm 271, the extremity of which engages a notch 272 in the locking bolt carriage or frame 233, so as to prevent lateral movement of the locking bolts in a direction in which the door will be unbolted.

The time locking mechanism 270 is of usual type and operates automatically to disengage the arm 271 from the notch 272, then the locking bolt operating mechanism can be operated to withdraw the locking bolts 231 from the recesses 232 in the door, subject of course to the releasing action of the locks 249 and 257.

When it is desired to unbolt the door and assuming that the time locking mechanism 270 has operated to release the arm 271 from the notch 272, the operator first actuates knobs 244 and 245 to turn the pointers 251 and 265 to predetermined positions in which the locks 249 and 257 will operate their associated mechanism so as to permit operation of the rack bar 234.

After the pointers 251 and 265 have been properly set and the locking mechanism of the rack bar 234 thereby released, the operator can turn hand wheel 176, which action effects rotation of the gear 235, with the result that the locking bolts 231 are moved from the position shown in Fig. 2 to the position shown in Fig. 3.

As will be understood the above described operation of the unbolting mechanism of the door precedes the action of rotating the door hereinabove described.

As shown in Figs. 2 and 3 the rear opening 13 is normally closed by a gate 128 of the usually provided for vault doors. As is customary, the gate 128 is adapted to be opened by a watchman to permit entrance to or exit from the interior of the vault.

In order to cover the space between the door 14 and its housing when the door is in open position (see Fig. 3) two hinged foot plates 129 and 130, are provided. When the door is in closed position the foot plates are in the position shown in Figs. 2 and 5, and when the door is open foot plate 129 is disposed in the outer end 12 of opening 11, and foot plate 130 is disposed in the inner end 12 of said opening, as shown in Fig. 3.

What I claim is:—

1. A closure for safes or vaults comprising a housing having a cylindrical bore, a door rotatably mounted within the bore, the axes of said bore and said door coinciding, and surfaces formed eccentrically on said door for bearing against the wall of said bore when said door is rotated towards closed position.

2. A door for safes, vaults and the like, composed of sections and including, in combination, a base plate, a cap plate and a plurality of side members of composite tubular construction between and fastened to said plates and spaced apart to provide a passageway through the door, a rotatable closure member within said side members, composed of sections and including, in combination, a base plate, a cap plate and two side members of composite tubular construction between and fastened to said plates and spaced apart to provide a passageway therethrough, said latter two side members having eccentrically formed arcuate surfaces for engaging the walls of said first named side members only when the closure member is in door closing position, journals mounted in both of said base and cap plates for rotatably supporting said closure members, ball bearings for supporting both of said journals, and eccentric means for adjusting the relative positions of said bearings.

3. A closure for vaults, safes and the like comprising a housing having a cylindrical bore, a rotatable closure member within said housing, including a base plate, a cap plate and two side sections fastened to said plates and spaced apart to provide a passageway therethrough, diametric openings formed in said housing at the front and rear thereof, the passageway through said closure member being adapted to be brought into and out of coincidence with said diametric openings for opening or closing the vault or safe, and arcuate peripheral surfaces formed on the exterior of said side sections of the closure member and adapted to bind against the wall of the housing bore when said closure member is rotated to close the openings through said housing.

4. A door of the class described comprising a housing having a vertical cylindrical bore, front and rear vertical arcuate bearing surfaces formed on the bore of the housing for the door, a door, means for rotating said door about a vertical axis without imparting any vertical movement to the door, said door having front and rear vertical arcuate surfaces adapted to respectively engage said housing bearing surfaces when the door is in closed position, the center of curvature of the arcuate door sections and the housing bearing surfaces being, respectively, eccentrically disposed with respect to the axial center of the door so that when the door is rotated from closed to open position the door sections will move out of engagement with the bearing surfaces.

5. A closure for vaults, safes and the like including, in combination, a housing having a vertical cylindrical bore, front and rear openings intersecting said bore, a door, means for rotating said door about a vertical axis for closing said openings without imparting any vertical movement to the door, sealing means formed around the openings in said housing for said door, and means for wedging said door into engagement with said sealing means only by rotary movement when said door is turned in a direction towards closed position and for unwedging said door only by rotary movement in the opposite direction.

6. A door of the class described comprising a housing having a vertical cylindrical bore, front and rear openings intersecting said bore, front and rear vertical arcuate bearing surfaces formed on the bore on opposite sides of said openings, a door, means for rotating the door about a vertical axis without imparting any vertical movement to the door, said door including two sections spaced apart transversely of the axis of rotation to form a space therebetween, the outer walls of said door sections being arcuately formed, the center of curvature of the arcuate walls of said door sections and the bearing surfaces of said housing being offset with respect to the vertical turning axis of the door.

7. A door of the class described comprising a housing having a vertical cylindrical bore, front and rear vertical arcuate bearing surfaces formed on the bore of the housing for the door, a door, means for rotating the door about a vertical axis without imparting any vertical movement to the door, said door having front and rear vertical arcuate surfaces adapted to respectively engage said housing bearing surfaces when the door is in closed position, the center of curvature of the rear door section and rear housing bearing surfaces and the center of curvature of the front door section and front housing bearing surfaces being, respectively, diametrically disposed on opposite sides of the axial center of the door so that when the door is rotated from closed to open position the door sections will move out of engagement from the bearing surfaces.

8. A door of the class described comprising a housing having a vertical cylindrical bore, front and rear openings intersecting said bore, front and rear arcuate bearing surfaces formed on the bore adjacent said openings, a door, means for rotating said door about a vertical axis without imparting any vertical movement to the door, said door having front and rear sections spaced apart transversely of the axis of rotation to form a space therebetween adapted to aline with said front and rear housing openings when the door is in open position, the outer walls of said door sections being arcuately formed, the center of curvature of the rear door section and rear housing bearing surfaces and the center of curvature of the front door section and front housing bearing surfaces being, respectively eccentrically disposed with respect to the axial center of the door so that when the door is rotated from closed to open position the door sections will move out of engagement from the bearing surfaces.

9. A closure for vaults, safes and the like including, in combination, a wall having a cylindrical bore, diametrically disposed openings formed in the wall of said bore, a door adapted to bear against said bore at the margins of said openings, means for rotating the door about a vertical axis without imparting any vertical movement to the door, said door including two walls spaced apart transversely of the axis of rotation to form a space therebetween, the outer surfaces of said walls being eccentrically disposed whereby to wedge fit the surface of said bore when said door is rotated to close said openings.

10. A closure of the type described including in combination, a housing having a vertical cylindrical bore, front and rear openings intersecting said bore, sealing ribs formed on the wall of said bore adjacent said openings, each of said sealing ribs having an arcuate surface formed thereon, the radii of the curvature of the arcuate surface of said sealing ribs being the same, said arcuate surfaces being offset with the center of said bore whereby said arcuate sealing ribs are eccentrically disposed with respect to the center of said bore, a door for closing said openings in the housing mounted for rotation on an axis coinciding with the center of said bore, means for rotating said door without imparting any vertical movement to the door, and eccentrically disposed surfaces formed on said door for effecting through said sealing ribs tight joints at the margins of said openings when the door is in closed position and adapted to clear the wall of said bore when the door is in open position.

WILLIAM E. WILKINSON.